(12) United States Patent
Yoon et al.

(10) Patent No.: US 8,706,157 B2
(45) Date of Patent: Apr. 22, 2014

(54) MOBILE COMMUNICATION TERMINAL AND DATA SYNCHRONIZATION METHOD

(75) Inventors: Hyung Sik Yoon, Suwon-si (KR); Su Min Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 1464 days.

(21) Appl. No.: 11/964,657

(22) Filed: Dec. 26, 2007

(65) Prior Publication Data

US 2008/0167066 A1     Jul. 10, 2008

(30) Foreign Application Priority Data

Jan. 4, 2007   (KR) ................... 10-2007-0000991

(51) Int. Cl.
*H04M 1/00*    (2006.01)

(52) U.S. Cl.
USPC ........................................ 455/550.1; 709/228

(58) Field of Classification Search
USPC .......... 455/550.1, 556.1, 556.2, 575.1, 575.2, 455/566; 709/206, 228, 248
See application file for complete search history.

(56) References Cited

U.S. PATENT DOCUMENTS

| | | | |
|---|---|---|---|
| 6,879,996 B1* | 4/2005 | Laves | 709/206 |
| 7,032,003 B1* | 4/2006 | Shi et al. | 709/203 |
| 7,680,849 B2* | 3/2010 | Heller et al. | 707/621 |
| 2005/0203905 A1* | 9/2005 | Jung et al. | 707/8 |
| 2007/0286099 A1* | 12/2007 | Stocklein et al. | 370/259 |

FOREIGN PATENT DOCUMENTS

| | | |
|---|---|---|
| KR | 1020030052030 | 6/2003 |
| KR | 1020050049334 | 5/2005 |
| KR | 1020060124235 | 12/2006 |
| KR | 100663497 | 1/2007 |

OTHER PUBLICATIONS

Korean Intellectual Property Office Application Serial No. 10-2007-0000991, Notice of Allowance dated Apr. 18, 2013, 2 pages.

* cited by examiner

*Primary Examiner* — Myron K Wyche
(74) *Attorney, Agent, or Firm* — Lee, Hong, Degerman, Kang & Waimey

(57) ABSTRACT

A mobile terminal includes a transceiver unit for receiving a synchronization request message from a wireless network entity, a memory unit for storing first user data, a display unit for displaying a synchronization indicator to indicate a need for synchronization of the user data stored in the memory unit, and a controller for controlling display of the synchronization indicator responsive to the synchronization request message received by the transceiver unit.

29 Claims, 13 Drawing Sheets

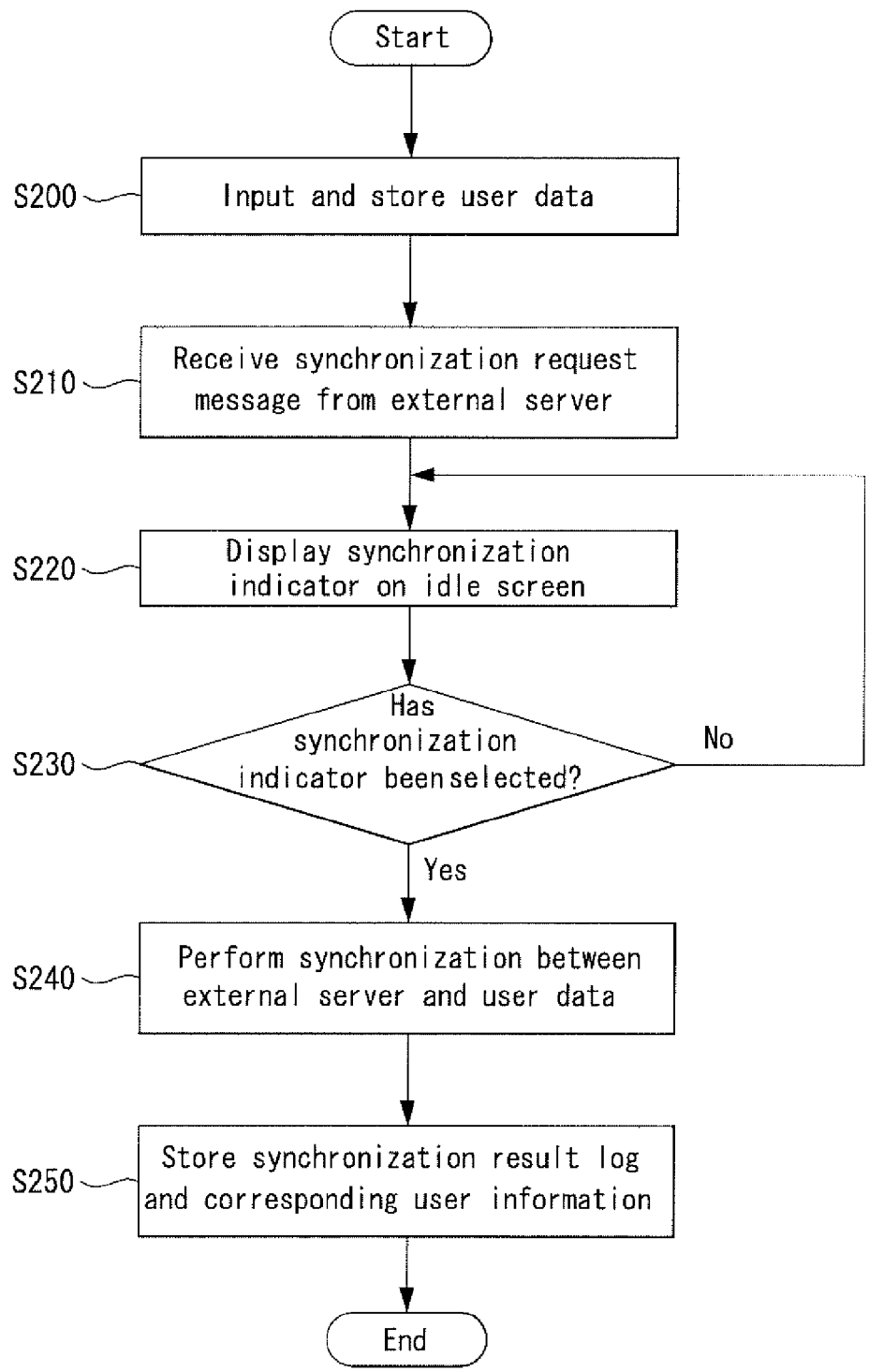

FIG. 13(a)

| Synchronization result log list |
|---|
| 1  Telephone number |
| 2  Schedule |
| 3  Memo |

FIG. 13(b)

| Telephone number |
|---|
| 1  2006/12/27  12:00 PM |
| 2  2006/12/1    1:00 PM |
| 3  2006/11/30   9:00 AM |
| 4  2006/10/1   11:20 AM |
| 5  2006/10/1   10:00 AM |

FIG. 13(c)

| Synchronization result log |
|---|
| 2006/12/1 1:00 PM |
| Telephone directory |
| - Total number: 100 |
| - Update: 1 |
| - Delete: 0 |

FIG. 13(d)

| Telephone number list | |
|---|---|
| 001 : 010-1111-3728 | |
| 002 : 010-1122-6000 | |
| 003 : 010-2000-3972 | |
| 004 : 010-4000-1000 | |
| 005 : 010-5000-2000 | |
| 006 : 010-2000-1234 | |
| 007 : 010-3679-1004 | |
| Cancel | Synchronization —340 |

FIG. 13(e)

| Telephone number list | |
|---|---|
| 001 : 010-1111-3728 | |
| 002 : 010-1122-6000 | |
| Synchronization is being performed | |
| 007 : 010-3679-1004 | |
| Cancel | Synchronization |

FIG. 13(f)

| Telephone number list | |
|---|---|
| 001 : 010-1111-3728 | |
| 002 : 010-1122-6000 | |
| Synchronization has been successfully completed. | |
| 007 : 010-3679-1004 | |
| Cancel | Synchronization |

MOBILE COMMUNICATION TERMINAL AND DATA SYNCHRONIZATION METHOD

CROSS REFERENCE TO RELATED APPLICATIONS

Pursuant to 35 U.S.C. §119(a), this application claims the benefit of earlier filing date and right of priority to Korean Application No. 2007-0000991, filed on Jan. 4, 2007, the contents of which are hereby incorporated by reference herein in their entirety.

FIELD OF THE INVENTION

The present invention relates to a mobile communication terminal and a data synchronization method.

DISCUSSION OF THE RELATED ART

As the demand for mobile communication terminals rapidly increases, mobile communication terminals having various functions for convenient services are provided.

One of various functions provided by the mobile communication terminal is a personal information management (PIM) function to facilitate the recording, tracking, and management of certain types of personal information such as telephone numbers, schedules and notes.

The PIM function is used by inputting and changing such personal information in a mobile communication terminal or server. The mobile communication terminal and the server synchronize data through synchronization of input or changed data.

A user can initiate synchronization between the mobile communication terminal and server by using a synchronization menu provided by the mobile communication terminal when it is necessary to synchronize the data.

As described above, synchronization is typically self-initiated by the user, i.e., whenever the user feels the need for synchronization, in the absence of a reminder for synchronization. Thus, if the last synchronization was performed by the user a long time ago, the user might not remember when the last synchronization was carried out and would not know whether or when synchronization with the server is necessary.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An aspect of the present invention is to display or activate a synchronization indicator in a mobile communication terminal to inform a need for synchronization of user data when a synchronization request message is received from a server.

Another aspect of the present invention is to execute synchronization when a synchronization indicator is selected.

Still another aspect of the present invention is to store a synchronization result log and corresponding user data upon synchronization.

In an aspect, a mobile communication terminal according to the present invention comprises a transceiver unit for receiving a synchronization request message from a wireless network entity, a memory unit for storing first user data, a display unit for displaying a synchronization indicator to indicate a need for synchronization of the first user data stored in the memory unit, and a controller for controlling display of the synchronization indicator responsive to the synchronization request message received by the transceiver unit.

The user data may comprise personal information management (PIM) data having at least one of a telephone number, a schedule and a note.

The mobile communication terminal may further comprise an input unit for selecting the synchronization indicator displayed on the display unit. The controller executes synchronization between the first user data stored in the memory unit and second user data stored in an external server responsive to the synchronization indicator selected via the input unit.

The controller of the mobile communication terminal may execute the synchronization using a synchronization markup language protocol.

The memory unit of the mobile communication terminal may further store synchronization set information of the first user data. The controller may be configured to execute synchronization of the first user data selected from the result log with the second user data stored in the external server responsive to the user input.

The memory unit may further store synchronization set information of the first user data. The controller may also execute synchronization of the user data according to the synchronization set information stored in the memory unit.

The synchronization set information may comprise at least one of an alarm mode, a display mode, an activation mode, and a synchronization indicator display region.

The set up information for display in the synchronization set information may comprise one or more of a specific number of the synchronization request messages to be received before displaying the synchronization indicator, a number of received synchronization request messages, and temporal information indicating the last time the synchronization request message was received.

The controller may control the synchronization indicator to be displayed as an icon on the display unit, displayed at an indicator region, displayed on an idle screen of the display unit, or highlighted and activated.

In another aspect, a data synchronization method of the present invention comprises storing first user data in memory associated with a mobile terminal, receiving a synchronization request message from a wireless network entity, and displaying a synchronization indicator to indicate a need for synchronization of the first user data responsive to the receiving of the synchronization request message.

The data synchronization method may further comprise receiving user input which selects the synchronization indicator, and synchronizing the first user data stored in the memory with second user data stored in an external server responsive to the user input.

The data synchronization method may further comprise storing a result log comprising information relating to the synchronization in the memory, receiving user input which selects the first user data from the result log, further receiving user input which selects a request for synchronization of the user data, and synchronizing the first user data selected from the result log with the second user data stored in the external server responsive to the request for synchronization.

The data synchronization method may further comprise storing synchronization set information of the user data and synchronizing the first user data according to synchronization set information.

The data synchronization method may further comprise displaying the synchronization indicator as an icon on a display unit, displaying the synchronization indicator at an indicator region, displaying the synchronization indicator on an idle screen of the display unit, and highlighting the synchronization indicator.

BRIEF DESCRIPTION OF THE DRAWINGS

Embodiments of the present invention are herein described in detail with reference to the following drawings in which like numerals refer to like elements.

The above and other aspects, features, and advantages of the present invention will become more apparent upon consideration of the following description of preferred embodiments, taken in conjunction with the accompanying drawing figures.

FIG. 3 is a flowchart illustrating a message display method according to an embodiment of the present invention.

FIGS. 13(a)-13(f) illustrate an example in which a specific result log is selected and is synchronized to user data corresponding to the selected result log.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
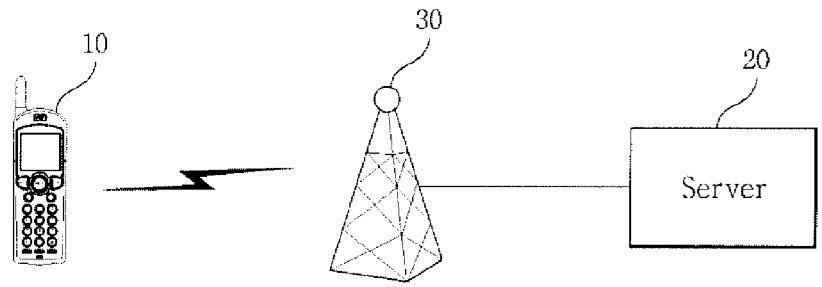
FIG. 1 illustrates a synchronization system according to an embodiment of the present invention.

FIG. 1 illustrates a synchronization system according to an embodiment of the present invention. The synchronization system comprises a mobile communication terminal 10 and a server 20 connected via a base station 30.

A user can directly input user data to the mobile communication terminal 10, or can input user data by gaining access to the server 20. The term "user data" refers to data such as PIM data or other types of data. Examples of user data include one or more of a telephone number, a schedule, and a memo.

Synchronization of user data can be executed between the mobile communication terminal 10 and the server 20 whether the user directly inputs user data to the mobile communication terminal 10 or inputs user data by gaining access to the server 20.

In this embodiment, in order to synchronize the user data between the mobile communication terminal 10 and the server 20, a synchronization markup language protocol may be used.

Figure 2:
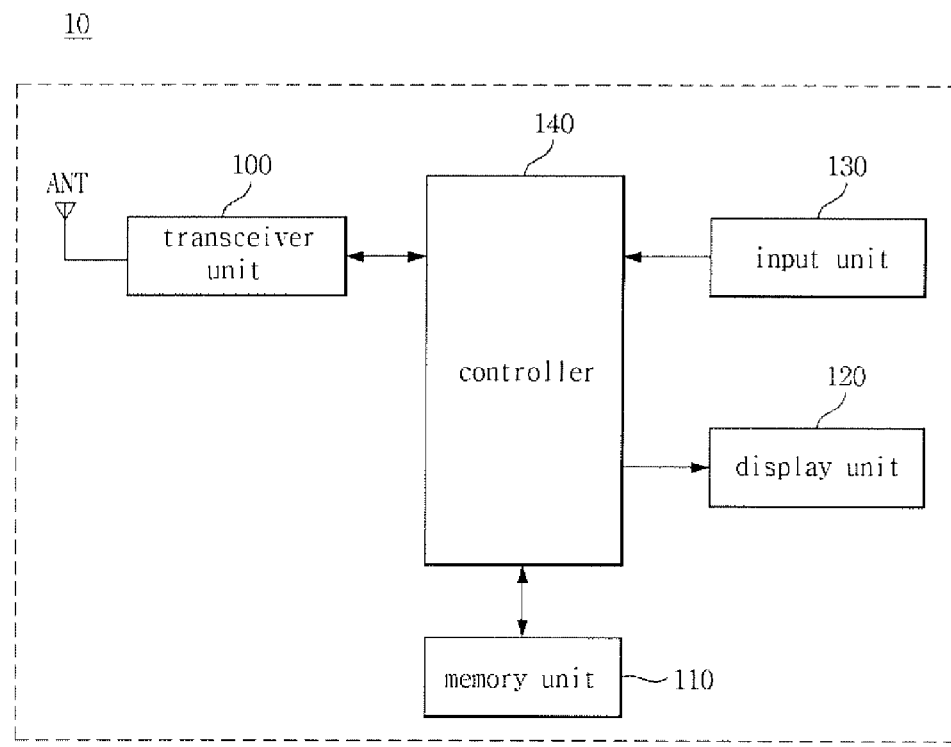
FIG. 2 is a block diagram illustrating a mobile communication terminal according to an embodiment of the present invention.

FIG. 2 is a block diagram illustrating a mobile communication terminal 10 according to an embodiment of the present invention. The mobile communication terminal comprises a transceiver unit 100, a memory unit 110, a display unit 120, an input unit 130 and a controller 140.

The transceiver unit 100 receives a synchronization request message from the server 20 through an antenna ANT via the base station 30. Further, the transceiver unit 100 transmits and receives a signal to synchronize the user data between the server 20 and the mobile communication terminal 10.

The memory unit 110 may be implemented using flash memory, RAM, electrically erasable programmable read only memory (EEPROM), and the like. The memory unit 110 stores a program for controlling overall operation of the mobile communication terminal 10. The memory unit 110 also stores user data and user data synchronization set information.

The display unit 120 displays various types of information. The display unit 120 also displays or activates a synchronization indicator to inform the need for synchronization of user data stored in the memory unit 110 when a synchronization request message is received by the transceiver unit 100.

The input unit 130 may be equipped with numeric keys and various function keys, and outputs a corresponding signal to the controller 140 when the synchronization indicator displayed on the display unit 120 is selected or reply screen switch information is set.

The controller 140 may be implemented using a suitable processor or controller configured to control input and output of the mobile communication terminal 10. The controller 140 controls the synchronization indicator to be displayed or activated on the display unit 120.

Further, the controller 140 performs synchronization between user data stored in the memory unit 110 and user data stored in an external server 20 when the synchronization indicator is selected through the input unit 130. At this time, the controller 140 may execute the synchronization of the user data according to the synchronization set information stored in the memory unit 110.

An example of a data synchronization method according to an embodiment of the present invention is described below.

FIG. 3 is a flowchart illustrating a method for displaying a message according to an embodiment of the present invention. A message display method comprises a storage block S200 includes inputting and storing user data, and block S210 includes receiving a synchronization request message from an external server. Blocks S220 to S250 include displaying or activating a synchronization indicator to inform the need for synchronization of user data when the synchronization request message is received.

Figure 4A:
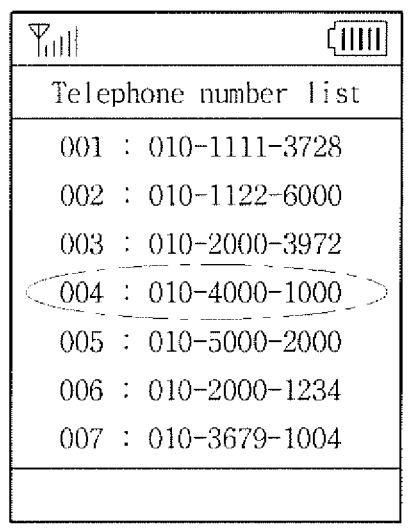
FIGS. 4(a) and 4(b) illustrate user data according to an embodiment of the present invention.
Figure 4B:
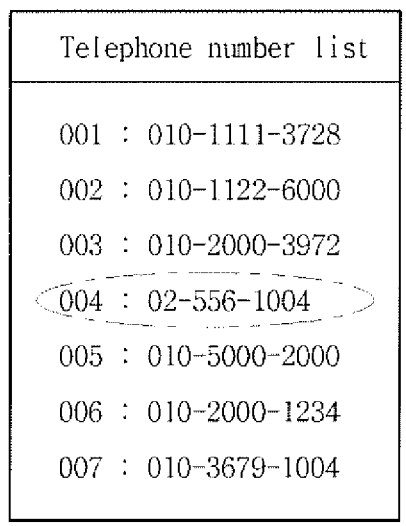

FIGS. 4(a) and 4(b) illustrate user data according to an embodiment of the present invention. In FIG. 4(a), user data, as exemplified by telephone numbers, are inputted through the input unit 130 and stored in the memory unit 110 (block S200 in FIG. 3).

The inputted telephone number is stored in both the mobile communication terminal 10 and the server 20 through synchronization. A method of synchronizing between the mobile communication terminal 10 and the server 20 according to one embodiment of the present invention is described below.

In this embodiment, a user accesses the server 20 using a terminal or the mobile communication terminal 10, and partially modifies the telephone numbers stored in the server 20. For example, a telephone number "004: 10-4000-1000" stored in the server 20 can be modified and stored as "004: 2-556-1004," as illustrated in FIG. 4(*b*).

Accordingly, the server 20 transmits a synchronization request message to the mobile communication terminal 10 to inform the need for synchronization of the user data due to the change of the user data in the server 20. The synchronization request message is received by the transceiver unit 100 of the mobile communication terminal 10 via the base station 30 in block S210 (FIG. 3).

Figure 5A:
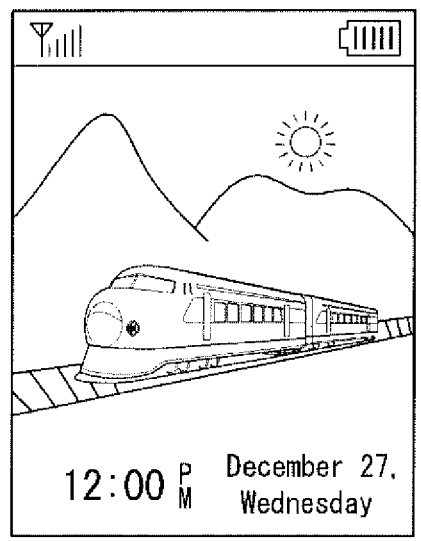
FIGS. 5(a) and 5(b) illustrate an example in which a synchronization indicator is displayed on an idle screen when a synchronization request message is received according to an embodiment of the present invention.
Figure 5B:
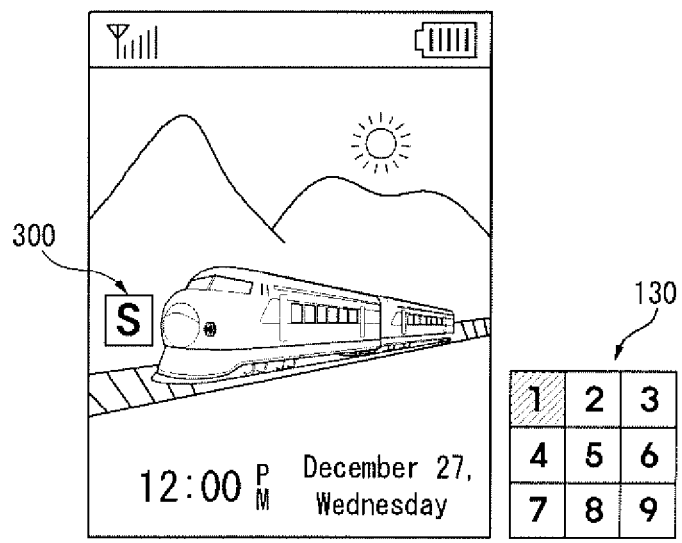

FIGS. 5(*a*) and 5(*b*) illustrate an example in which a synchronization indicator is displayed on an idle screen when a synchronization request message is received according to an embodiment of the present invention. When the screen of the display unit 120 is in an idle state and the synchronization request message is received through the transceiver unit 100, a synchronization indicator 300 is displayed on the idle screen of the display unit 120 under the control of the controller 140 as illustrated in FIG. 5(*b*) (block S220 in FIG. 3).

The synchronization indicator 300, which can be displayed as an icon on the screen, informs the need for synchronization of user data stored in the memory unit 110.

The controller 140 determines whether the synchronization indicator 300 has been selected in block S230 (FIG. 3). The synchronization indicator 300 can be selected using the input unit 130. For example, the synchronization indicator 300 can be selected by pressing a number key "1," which is set to select the synchronization indicator 300. Alternatively, the synchronization indicator 300 can be selected by pressing any other key, which is set to select the synchronization indicator 300.

When the synchronization indicator 300 is selected in this manner, the controller 140 executes synchronization of the user data between the server 20 and the mobile communication terminal 10 in block S240 (FIG. 3).

At this time in block S250 (FIG. 3), the controller 140 stores a result log and corresponding user data in the memory unit 110 after the synchronization.

Figures 6A, 6B:
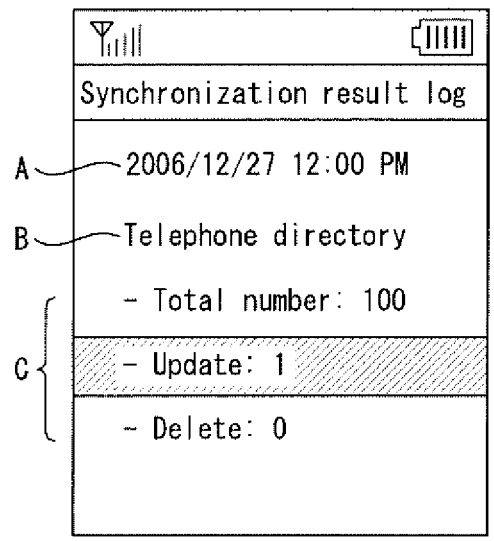
FIGS. 6(a) and 6(b) illustrate a synchronization result log according to an embodiment of the present invention.

FIGS. 6(*a*) and 6(*b*) illustrate a result log generated after synchronization according to an embodiment of the present invention. When synchronization of the user data between the server 20 and the mobile communication terminal 10 is executed, the controller 140 generates a result log, as illustrated in FIG. 6(*a*).

The result log may comprise a time A indicating when the synchronization was executed, a type B of synchronized user data, and a method C of changing synchronized user data.

Further, the controller 140 stores synchronized user data in the memory unit 110 when the result log is generated. At this time, user data can be confirmed by selecting the method C of changing synchronized user data.

For example, in the method C of changing synchronized user data, if "update: 1" is selected as shown in FIG. 6(*a*), updated user data, "004: 2-556-1004" can be confirmed as illustrated in FIG. 6(*b*).

Figure 7:
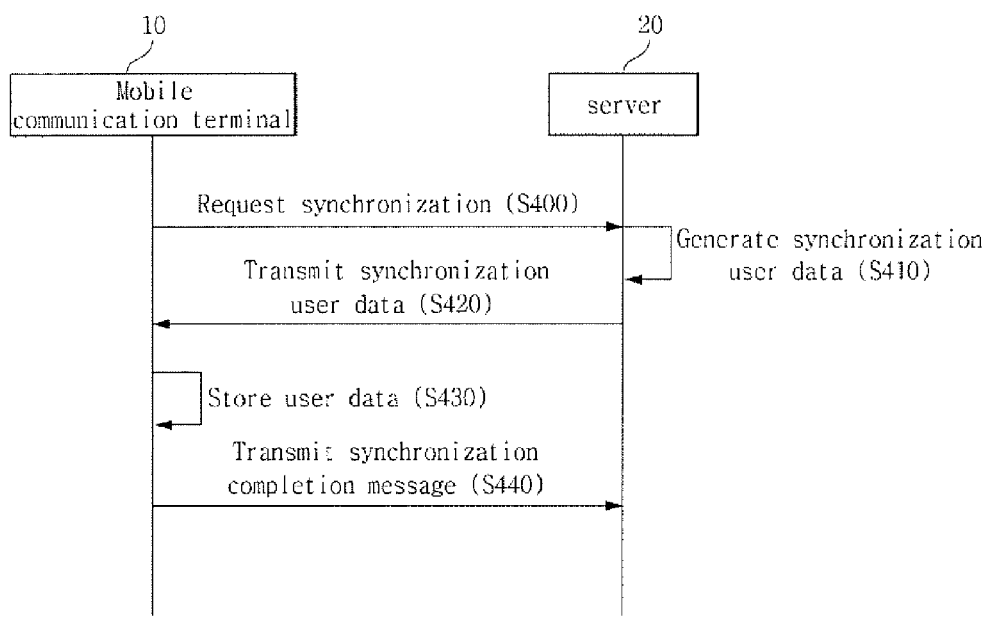
FIG. 7 is a flowchart illustrating a process of executing synchronization with a server according to an embodiment of the present invention.

FIG. 7 is a flowchart illustrating a process of synchronization between a mobile communication terminal and a server according to an embodiment of the present invention. The mobile communication terminal 10 and the server 20 may use a synchronization markup language protocol in order to execute synchronization of user data.

The mobile communication terminal 10 opens or initiates a synchronization session with the server 20, and requests synchronization with the server 20 in block S250 (FIG. 3) S400. At this time, the mobile communication terminal 10 generates data such as identification information, a protocol, SyncML version information, source information, and the like, and transmits the generated data to the server 20.

The server 20 authenticates whether data synchronization with the mobile communication terminal 10 has been executed, and generates user data to be synchronized in block S410. At this time, the server 20 can generate user data to be synchronized, including information which has been changed since the last synchronization.

For example, "004: 10-4000-1000", which was listed in the previous user data as shown in FIG. 4(*a*), has been changed to "004: 2-556-1004" in the server 20 as shown in FIG. 4(*b*). Accordingly, the server 20 generates user data to be synchronized and changed, and transmits the generated user data to the mobile communication terminal 10 in block S420.

The mobile communication terminal 10 stores the user data received from the server 20 in the memory unit 110 in block S430.

Thereafter, the mobile communication terminal 10 sends a synchronization completion message to the server 20 and closes the synchronization session in block S440.

The synchronization process between the mobile communication terminal 10 and the server 20 is not limited to the above embodiment, but may be executed in accordance with a synchronization markup language protocol.

In the above embodiment, when the synchronization request message is received by the transceiver unit 100, the synchronization indicator 300 is displayed on the idle screen as illustrated in FIG. 5. However, the present invention is not limited to the above embodiment, and an example according to an alternative embodiment of the present invention is described below.

Figure 8A:
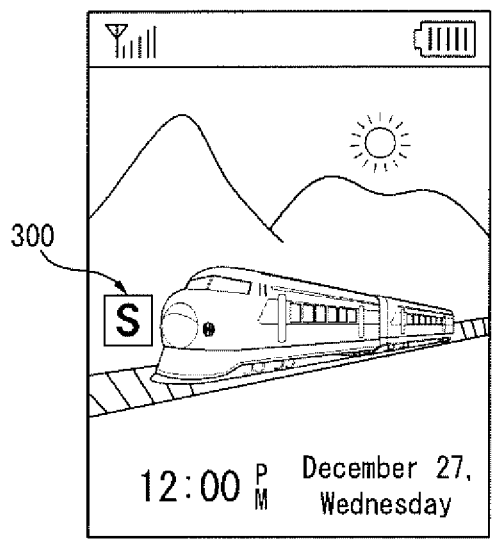
FIGS. 8(a) and 8(b) illustrate an example in which a synchronization indicator which is displayed on an idle screen, is activated when a synchronization request message is received according to another embodiment of the present invention.
Figure 8B:
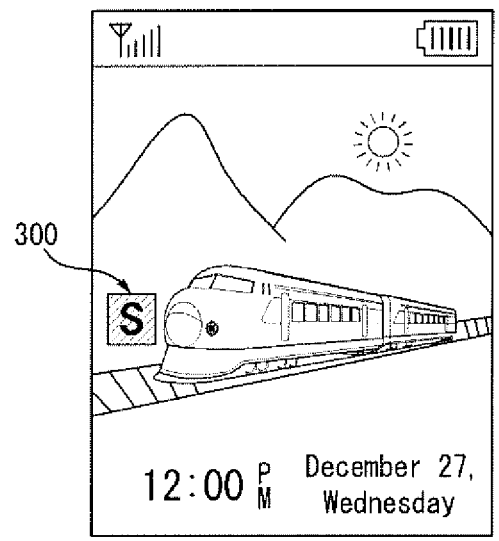

FIGS. 8(*a*) and 8(*b*) illustrate an example in which the synchronization indicator 300 displayed on the idle screen is activated when a synchronization request message is received in accordance with another embodiment of the present invention.

When a synchronization request message is received by the transceiver unit 100, the controller 140 activates the synchronization indicator 300 displayed on the idle screen by changing the color of the synchronization indicator 300 as illustrated in FIG. 8(*b*).

For example, the color of the synchronization indicator 300 on the idle screen is normally black when no synchronization request message is received. When a synchronization request message is received, the synchronization indicator 300 will be activated and highlighted in a color. Alternatively, the color of the synchronization indicator 300 may be yellow when no synchronization request message is received, and once the synchronization request message is received, the synchronization indicator 300 will be activated and highlighted in red.

Alternatively, the color of the synchronization indicator 300 may be yellow when no synchronization request message is received, and once the synchronization request message is received, the synchronization indicator 300 will be activated to flicker at predetermined time intervals.

Figure 9:
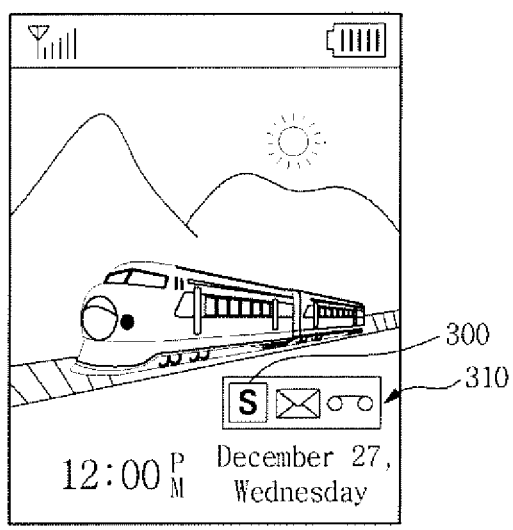
FIG. 9 illustrates an example in which the synchronization indicator is added to a favorites box.

Further, the synchronization indicator 300 may also be displayed in a favorites box as illustrated in FIG. 9.

The controller 140 controls the synchronization indicator 300 to add it to a favorites box 310 formed and displayed on the idle screen of the display unit 120.

If desired, the synchronization indicator 300 is not displayed in the favorites box 310 until the synchronization request message is received. The synchronization indicator 300 will be displayed in the favorites box 310 once the synchronization request message is received.

The synchronization indicator 300 may be displayed in the favorites box 310 as an icon and once a synchronization request message is received, the icon of the synchronization indicator 300 in the favorites box 310 can be highlighted and displayed in a different color, or activated to flicker at predetermined time intervals as described above in connection with FIGS. 8(a) and 8(b).

Figure 10:
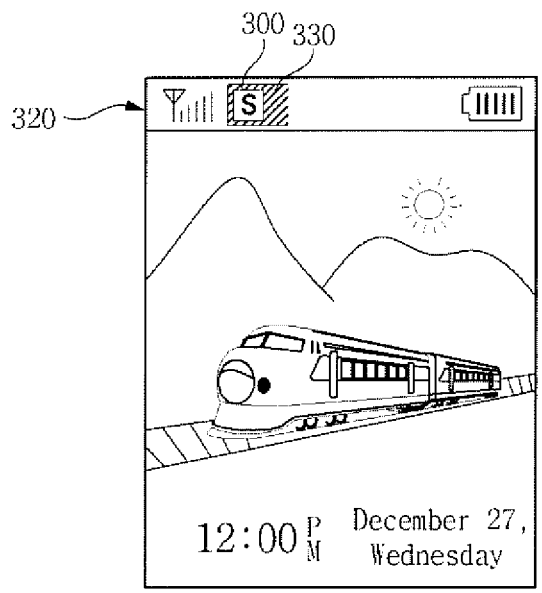
FIG. 10 illustrates an example in which the synchronization indicator is displayed at an indicator region.

Furthermore, as illustrated in FIG. 10, the synchronization indicator 300 may be displayed at an indicator region 320 of the display unit 120. The indicator region 320 generally refers to a region, which is shown positioned at an upper side of the idle screen of the mobile communication terminal 10 and displays an antenna reception indicator, a remaining battery power indicator, alarm indicator, and the like, in icon form.

In this embodiment, the controller 140 may provide a cursor 330 at the indicator region 320 for allowing a user to easily select the synchronization indicator 300. A method of activating the synchronization indicator 300 when a synchronization request message is received is the same as the above.

Figure 11:
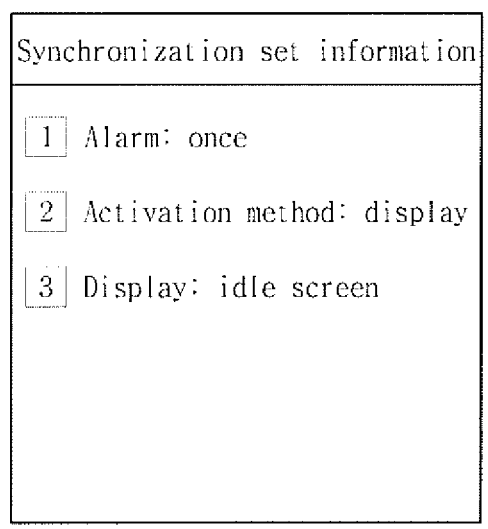
FIG. 11 illustrates an example of synchronization set information.

As illustrated in FIG. 11, synchronization set information can be set by a user. The synchronization set information may comprise an alarm preference, a display method, an activation method, a display region and the like of the synchronization indicator 300.

For example, the synchronization set information can be set as follows: "1. Alarm: once," "2. Activation Method: display," and "3. Display Region: idle screen."

If "1. Alarm: once" is set, the synchronization indicator 300 is displayed when the synchronization request message is received once. If "2. Activation Method: display" is set, the synchronization indicator 300 is displayed when the synchronization request message is received as described above with reference to FIGS. 5(a) and 5(b). If "3. Display Region: idle screen" is set, the synchronization indicator 300 is displayed on the idle screen.

As described above, the synchronization indicator 300 may be displayed according to the synchronization set information as set by a user. For example, if "1. Alarm: three times" is set in the synchronization set information, the synchronization indicator 300 will be displayed when the synchronization request message is received three times.

Figure 12A:
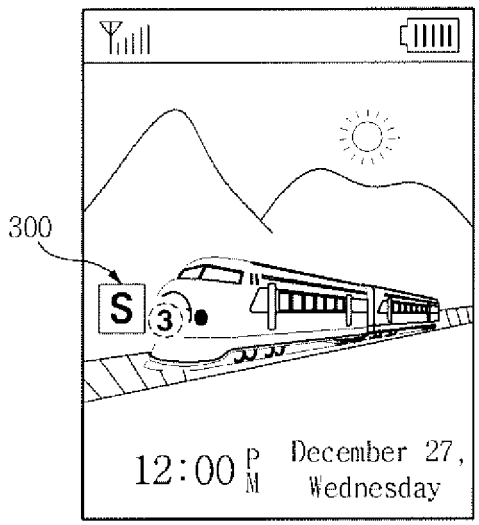
FIGS. 12(a) and 12(b) illustrate examples in which the number and time of reception of a synchronization request message are displayed.
Figure 12B:
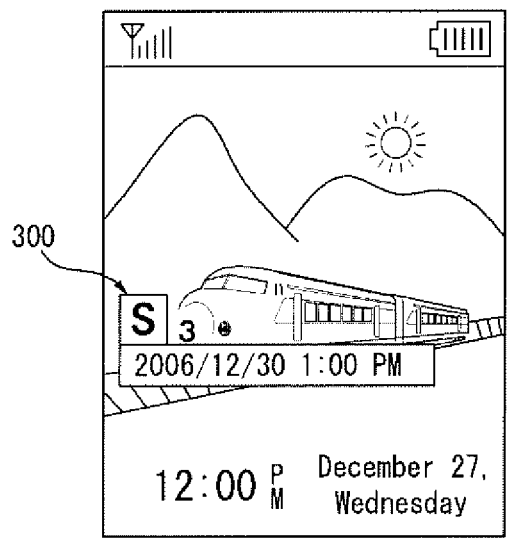

FIGS. 12(a) and 12(b) illustrate examples in which the number and time of reception of a synchronization request message are displayed.

If the synchronization request message was received one or more times, but no synchronization has been executed, the controller 140 may control the number of received synchronization request messages to be displayed at one side of the synchronization indicator 300, as illustrated in FIG. 12(a).

Therefore, when the number of received synchronization request messages is three, a numeral "3" will be displayed at one side of the synchronization indicator 300.

Further, as illustrated in FIG. 12(b), the controller 140 may control temporal information, in which the last time a synchronization request message was received, to be displayed. For example, if the last time a synchronization request message was received is 2006/12/30, 1:00 PM, it can be displayed at one side of the synchronization indicator 300.

A further example includes a specific result log to be selected and user data corresponding to the specific result log to be returned as described below.

FIGS. 13(a)-13(f) illustrate an example in which a specific result log is selected and synchronized with user data corresponding to the result log.

The controller 140 stores a result log and corresponding user data in the memory unit 110 whenever synchronization between the server 20 and user data is performed.

Accordingly, one or more synchronization result logs can be stored in the memory unit 110, and can be displayed as a list of profiles as illustrated in FIG. 13(a). For example, the synchronization result logs can be categorized into "1. Telephone number," "2. Schedule," and "3. Memo."

If a user selects "1. Telephone number", the controller 140 controls a list of result logs related to telephone numbers to be displayed on the display unit 120, as illustrated in FIG. 13(b). In FIG. 13(b), "2. 2006/12/1, 1:00 PM" is selected by the user using the input unit 130.

Accordingly, the controller 140 controls synchronized result log information, which was synchronized on "2. 2006/12/1, 1:00 PM", to be displayed on the display unit 120 as illustrated in FIG. 13(c).

In this case, a user can select "Update: 1" in order to confirm information in the synchronization result log. Accordingly, the controller 140 controls user data to be displayed on the display unit 120 and controls a cursor to be placed at "004: 10-4000-1000", which has been changed, as illustrated in FIG. 13(d).

Thereafter, if the user wants a telephone number list, currently stored in the memory unit 110, to be synchronized with a telephone number list before the last synchronization, a synchronization menu 340 can be selected.

Thus, the controller 140 performs synchronization with the server 20 as illustrated in FIG. 13(e). The controller 140 then controls a completion message to be displayed on the display unit 120 when synchronization with the server 20 is completed, as illustrated in FIG. 13(f).

Accordingly, a telephone number list before the last synchronization was executed is stored in the memory unit 110. As described above, a synchronization result log and corresponding user data are stored upon synchronization. Thus, synchronization with erroneous user data can be prevented.

In the above embodiment, the synchronization result logs are stored and arranged by order of the profiles. However, the synchronization result logs can also be stored and arranged according to time sequence of synchronization. In other words, synchronization result log lists can be generated sequentially according to a synchronization sequence of a telephone number, a schedule and a memo.

In the above embodiment, user data is one of a telephone number, a schedule and a memo. However, the present invention is not limited to the above embodiment. Accordingly, the user data may comprise all data used by a user and synchronized with the server.

In the above embodiment, color or illumination of a synchronization indicator is changed in order to activate the synchronization indicator. However, the present invention is not limited to the above embodiment. Therefore, in order to activate the synchronization indicator, the size of the synchronization indicator on the display unit may be changed for a predetermined time. Alternatively, a preset alarm sound may be generated when a synchronization request message is received or until a user confirms the synchronization indicator. Alternatively, the synchronization indicator may be activated in various ways in accordance with the setting by the user.

Further, in the mobile communication terminal of the present invention, the synchronization indicator may be displayed in other forms as well as an icon form. For example, when a synchronization request message is received, a user may be informed of the reception of the synchronization request message in texts or multi-message format.

Further, in the mobile communication terminal of the present invention, synchronization with a server can be executed by using a wireless communication technology, such as infrared communication or bluetooth.

As described above, the following advantages may be achieved.

First, when a synchronization request message is received from a server, a synchronization indicator is displayed or activated to inform the need for synchronization of user data. Accordingly, the time point when the user data synchronization is needed can be easily confirmed.

Second, once the synchronization indicator is selected by a user, synchronization is carried out. Thus, synchronization can be performed easily and rapidly.

Third, a synchronization result log and corresponding user data are stored upon synchronization. Accordingly, synchronization to erroneous user data can be prevented.

What is claimed is:

1. A mobile terminal, comprising:
   a transceiver unit configured to receive a synchronization request message from a wireless network entity;
   a memory unit configured to store first user data;
   a display unit configured to display a synchronization indicator;
   an input unit configured to receive a user input for selecting the synchronization indicator displayed on the display unit;
   a controller configured to:
   cause the display unit to display the synchronization indicator in response to the synchronization request message, wherein the synchronization indicator indicates a need for synchronization between the first user data stored in the memory unit and second user data stored in an external server;
   execute a first synchronization between the first user data and the second user data in response to the user input;
   cause the memory unit to store a first synchronization result log when the first synchronization has been executed;
   cause the display unit to display a list comprising information relating to synchronization history, the information comprising the first synchronization result log and a second synchronization result log;
   cause the display unit to display information related to the second synchronization result log when the second synchronization result log is selected from the list; and
   execute a second synchronization with the external server in response to an input for executing the second synchronization to update the first user data currently stored in the memory unit according to the first user data corresponding to the second synchronization result log.

2. The mobile terminal of claim 1, wherein the first user data comprises personal information management (PIM) data having at least a telephone number, a schedule, or a note.

3. The mobile terminal of claim 1, wherein the controller is further configured to execute the first synchronization using a synchronization markup language protocol.

4. The mobile terminal of claim 1, wherein the second synchronization result log is stored in the memory unit prior to the storing of the first synchronization result log.

5. The mobile terminal of claim 1, wherein:
   the memory unit is further stores configured to store synchronization set information of the first user data; and
   the controller is further configured to execute the synchronization between the first user data and the second user data according to the synchronization set information stored in the memory unit.

6. The mobile terminal of claim 5, wherein the controller is further configured to cause the display unit to display synchronization set information that comprises at least an alarm mode, a display mode, an activation mode, or a synchronization indicator display region.

7. The mobile terminal of claim 5, wherein set-up information for display in the synchronization set information comprises at least:
   a specific number of synchronization request messages to be received before displaying the synchronization indicator;
   a number of received synchronization request messages; or
   temporal information indicating a last time the synchronization request message was received.

8. The mobile terminal of claim 1, wherein the controller is further configured to cause the display unit to display the synchronization indicator as an icon.

9. The mobile terminal of claim 1, wherein the controller is further configured to cause the display unit to display the synchronization indicator at an indicator region located on a specific region of the display unit.

10. The mobile terminal of claim 1, wherein the controller is further configured to cause the display unit to display the synchronization indicator on an idle screen of the display unit.

11. The mobile terminal of claim 1, wherein the controller is further configured to cause the display unit to highlight or activate the synchronization indicator.

12. A data synchronization method, comprising:
    storing first user data in memory associated with a mobile terminal;
    receiving a synchronization request message from a wireless network entity;
    displaying a synchronization indicator in response to the synchronization request message, wherein the synchronization indicator indicates a need for synchronization between the first user data stored in the memory and second user data stored in an external server;
    receiving a user input for selecting the synchronization indicator;
    executing a first synchronization of the first user data stored in the memory with the second user data in response to the user input;
    storing a first synchronization result log when the synchronization has been executed;
    displaying a list comprising information relating to synchronization history, the information comprising the first synchronization result log and a second synchronization result log;
    displaying information related to the second synchronization result log when the second synchronization result log is selected from the list; and
    executing a second synchronization with the external server in response to an input for executing the second synchronization to update the first user data currently stored in the memory unit according to the first user data corresponding to the second synchronization result log.

13. The method of claim 12, wherein the first user data comprises personal information management (PIM) data having at least a telephone number, a schedule, or a note.

14. The method of claim 12, wherein the first synchronization of the first user data with the second user data is executed based upon a synchronization markup language protocol.

15. The method of claim 12, wherein the second synchronization result log is stored prior to the storing of the first synchronization result log.

16. The method of claim 12, further comprising:
storing synchronization set information of the first user data; and
synchronizing the first user data and the second user data according to the synchronization set information.

17. The method of claim 16, wherein further comprising displaying the synchronization set information that comprises at least an alarm mode, a display mode, an activation mode, or a synchronization indicator display region.

18. The method of claim 16, wherein set-up information for display in the synchronization set information comprises at least:
a specific number of synchronization request messages to be received before displaying the synchronization indicator;
a number of received synchronization request messages; or
temporal information indicating a last time the synchronization request message was received.

19. The method of claim 12, further comprising:
displaying the synchronization indicator as an icon.

20. The method of claim 12, further comprising:
displaying the synchronization indicator at an indicator region located on a specific region of display of the mobile terminal.

21. The method of claim 12, further comprising:
displaying the synchronization indicator on an idle screen of a display of the mobile terminal.

22. The method of claim 12, further comprising:
highlighting the synchronization indicator.

23. The mobile terminal of claim 4, wherein the second synchronization result log comprises:
a time indicating when the second synchronization was executed; and
a type of the second synchronized user data.

24. The mobile terminal of claim 23, wherein the second synchronization result log further comprises information indicating at least one change made in the second synchronized user data, the at least one change comprising at least update or deletion, and wherein the controller is further configured to cause displaying of updated or deleted user data as a result of the second synchronization in response to selection of the update or deletion from the second synchronization result log.

25. A mobile terminal, comprising:
a touch screen configured to display information and receive inputs;
a memory unit configured to store first user data;
a transceiver unit configured to receive a synchronization request message from a wireless network entity, wherein the synchronization request message informs a need for synchronization of the first user data due to a change of a second user data in an external sever; and
a controller configured to:
cause displaying of a synchronization indicator on the touch screen in response to the received synchronization request message;
execute first synchronization between the first user data and the second user data when the synchronization indicator displayed on the touch screen is touched;
cause the memory unit to store a first synchronization result log when the first synchronization has been executed;
cause the touch screen to display a list comprising information relating to synchronization history, the information comprising the first synchronization result log and a second synchronization result log;
cause the touch screen to display information related to the second synchronization result log when the second synchronization result log is selected from the list; and
execute a second synchronization with the external server in response to an input for executing the second synchronization to update the first user data currently stored in the memory unit according to the first user data corresponding to the second synchronization result log.

26. The mobile terminal of claim 25, wherein the controller is further configured to cause displaying of the synchronization indicator on an idle screen of the touch screen.

27. The mobile terminal of claim 26, wherein the controller is further configured to cause displaying of the synchronization indicator on an indicator region for providing status information related to the mobile terminal, the status information comprising an antenna reception indicator and a remaining battery power indicator.

28. The mobile terminal of claim 26, wherein the controller is further configured to enter an application screen related to the first user data when the second synchronization result log is selected from the list, the application screen including the updated first user data.

29. The mobile terminal of claim 1, wherein the second synchronization result log is stored in the memory prior to the storing of the first synchronization result log.

* * * * *